2,990,429
PRODUCTION OF ALKYL HALIDES

Geoffrey John Sleddon, Seamill, West Kilbride, Scotland, assignor to Imperial Chemical Industries Limited, London, England, a corporation of Great Britain
No Drawing. Filed Dec. 7, 1959, Ser. No. 857,534
Claims priority, application Great Britain Dec. 17, 1958
8 Claims. (Cl. 260—652)

The present invention relates to an improvement in or relating to the production of alkyl halides and more particularly to the production of alkyl halides from aluminium-containing compounds.

It is known that lower alkyl halides such as, for example, methyl chloride can be prepared by the reaction of aluminium chloride and an alcohol or ether such as methanol or dimethyl ether at elevated temperatures. It is also known that aluminium halides are capable of reacting with certain metal halides to form complex salts which are stable to relatively high temperatures for example, of the order of 600° C. These salts can be specially prepared but they are also to be found as undesired end products in certain manufacturing processes. Thus, for example, in the preparation of silanes by reacting organoaluminium halides with silicon halides in presence of metal halides capable of forming complexes with aluminium halides an undesired end product is such a complex halide, for example, sodium aluminium tetrachloride.

An object of the present invention is to provide a process for the production of lower alkyl halides. Another object is to provide a process for the recovery of halogen from complex aluminium halides. Other objects will appear hereinafter.

According to the present invention, these objects are accomplished by a process comprising reacting at an elevated temperature, a complex aluminium halide of formula $MX_n.AlX'_3$ where M is a metal of valency $n$ and X and X', which may be the same or different are chlorine, bromine or iodine, $MX_n$ is a metal halide capable of forming a stable complex with an aluminium halide with a compound of the general formula ROR' where R is a methyl or ethyl group, and R' is a methyl or ethyl group or hydrogen, and distilling therefrom the so-produced alkyl halide.

The complex aluminium halide may be a complex of a halide of a metal of groups I or II, for example, such as the chlorides of lithium, sodium, potassium, magnesium, calcium, copper, silver and the like. It is, however, preferred that the metal should be sodium or potassium. It is also preferred that the halogens should be bromine or chlorine since these are more advantageous than other halogens. A valuable application of our process is, however, in applying it to complex aluminium halides produced as end products in processes in which one of the starting materials is an organoaluminium halide. In such cases, the alkyl halide which is distilled off, may be reacted with metallic aluminium to give the required organoaluminium halide used as starting material for the process. The recovery of halogen in this way renders these processes more economically attractive. Such processes include, for example, the preparation of organosilanes by reacting organoaluminium halides with silicon halides in the presence of metal halides capable of forming complexes with aluminium halides. While the process of our invention can be usefully applied to any complex aluminium halide, it is most advantageously applied to sodium aluminium tetrachloride.

Suitable compounds of general formula ROR' include methanol, ethanol, dimethyl ether, diethyl ether and methyl ethyl ether. It is, however, preferred to use methanol if it is desired to produce a methyl halide and to use diethyl ether if an ethyl halide is desired.

While the reaction may be carried out at temperatures over a very wide range, it is normally convenient to operate at temperatures within the range 150 to 350° C. It is, in many cases preferred to operate at temperatures within the range 200 to 300° C. and it is further preferred to operate at a temperature which is above the fusion point of the specific complex aluminium halide used.

The two reactants may be brought into contact in a number of ways, for example, the complex aluminium halide may be heated in a column to the desired temperature and the other reactant passed through or over this in the form of vapour. In a modification of this method the complex aluminium halide may be passed continuously into a bed where it is converted to a fluidised state by the vapour of the other reactant being passed therethrough. In this method the process can, of course, be operated continuously. In another embodiment the two reactants can be heated together in a pressure reactor, followed by distillation of the alkyl halide subsequent to pressure release at the end of the reaction. In a further method the reactants may be mixed, for example in a heated kettle and heated at atmospheric pressure. It is, however, preferred to react by passing the vapour of the compound ROR' through a bed of the complex aluminium halide which may have an inert support, if desired, since it is a relatively easy matter to separate by fractional condensation the alkyl halide and any unreacted reactant. Furthermore, this method is more advantageous if it is desired to react the alkyl halide to an organoaluminium halide, since the vapour thereof may be passed over metallic aluminium in well known manner to give alkyl aluminium halides.

Our invention is further illustrated by the following examples in which all parts are by weight.

Example 1

39 parts of sodium aluminium tetrachloride were heated to 240° C. and stirred gently. 19 parts of methanol were passed slowly through the melt. The vapours distilling off were passed through two traps, the first at a temperature of 8° C. and the second at −80° C. 9 parts of unreacted methanol were collected in the first trap and 6.5 parts of methyl chloride containing a small proportion of hydrogen chloride were collected in the second trap.

Example 2

15 parts of diethylether and 16.5 parts of powdered lithium aluminium tetrachloride were mixed together and allowed to stand overnight. The mixture was then heated to 200° C. for a period of three hours, during which time 20 parts of ethyl chloride containing a trace of diethyl ether were distilled off and collected.

Example 3

6.3 parts of calcium chloride and 7.6 parts of aluminium chloride were fused together, the mass cooled and ground to a coarse powder. This powder was mixed with 10 parts of silica and loaded into a tower reactor which was heated at 220° C. while 3 parts of diethylether were passed down through the hot mass. The addition period was 40 minutes, and during that time 3 parts of product, subsequently shown to be ethylchloride, collected in the cooled exit trap.

What I claim is:
1. A process for the production of lower alkyl halides comprising reacting at an elevated temperature a complex aluminium halide of formula $MX_n AlX'_3$ where M is a metal selected from groups consisting of group I and group II of valency $n$ and X and X' are selected from the group consisting of chlorine, bromine and iodine, with a compound of the general formula ROR' where R is a radical selected from the group consisting of a methyl and ethyl group and R' is selected from the group consisting of a methyl and ethyl group and hydrogen and distilling therefrom the so produced alkyl halide.

2. A process as claimed in claim 1 wherein the metal M is selected from the group consisting of lithium, sodium, potassium, magnesium, calcium, copper and silver.

3. A process as claimed in claim 1 wherein the compound of general formula ROR' is selected from the group consisting of methanol, ethanol, dimethylether, diethylether and methylethylether.

4. A process as claimed in claim 1 wherein the reaction is carried out at a temperature within the range 150° C. to 350° C.

5. A process as claimed in claim 4 wherein the temperature is within the range of 200 to 300° C.

6. A process as claimed in claim 1 wherein the complex aluminium halide is in the form of a column and the compound of formula ROR' is passed therethrough in the form of a vapour.

7. A process as claimed in claim 1 wherein the complex aluminium halide is passed continuously into a fluidised bed and the compound of formula ROR'— is used as the fluidising medium.

8. A process as claimed in claim 1 wherein the reaction is carried out under superatmospheric pressure.

References Cited in the file of this patent
UNITED STATES PATENTS 2,755,316   Churchill et al. _____ July 17, 1956

OTHER REFERENCES

Thomas et al.: "Anhydrous Aluminium Chloride in Organic Chemistry," Reinhold Publishing Corp. (1941), p. 772.